(12) United States Patent
Johnson et al.

(10) Patent No.: US 6,583,726 B1
(45) Date of Patent: Jun. 24, 2003

(54) APPARATUS FOR DETECTING AND PREVENTING CHEMICAL OR BIOLOGICAL CONTAMINATION OF BUILDINGS

(75) Inventors: Duane M. Johnson, Perry, FL (US); Keith E. Johnson, Perry, FL (US)

(73) Assignee: Vent-Defense, LLC, Perry, FL (US)

( * ) Notice: Subject to any disclaimer, the term of this patent is extended or adjusted under 35 U.S.C. 154(b) by 10 days.

(21) Appl. No.: 10/043,292

(22) Filed: Jan. 14, 2002

(51) Int. Cl.$^7$ ................................................ G08B 21/00
(52) U.S. Cl. ........................ 340/627; 340/632; 454/256
(58) Field of Search .................................. 340/627, 632, 340/501, 506, 511, 529; 454/239, 254, 256, 257, 902, 909

(56) References Cited

U.S. PATENT DOCUMENTS 3,662,670 A * 5/1972 McCoy ........................ 454/902
4,351,359 A * 9/1982 Scherwarth ................... 454/909
6,217,441 B1 * 4/2001 Pearman ....................... 454/333

* cited by examiner

Primary Examiner—Anh La
(74) Attorney, Agent, or Firm—J. Wiley Horton

(57) ABSTRACT

An apparatus for detecting and containing chemical or biological contaminants. The invention includes one or more optical contaminant detectors, capable of detecting chemical and biological agents. A containment assembly is installed in the duct work of a building, just downstream from the main intake. Air flows linearly through the containment assembly. The air first flows through a first damper, then through the contamination sensor or sensors, and then through a second damper. If a sensor senses a contaminant, a controller shuts off the HVAC system, while simultaneously closing the first and second dampers. The containment assembly is thereby hermetically sealed—trapping any contaminants inside. The sensors and second damper are spaced sufficiently far apart so that no contaminant will flow through the second damper before its closure. The controller can also be configured to alert authorized personnel as to the potential contamination.

12 Claims, 2 Drawing Sheets

APPARATUS FOR DETECTING AND PREVENTING CHEMICAL OR BIOLOGICAL CONTAMINATION OF BUILDINGS

CROSS-REFERENCES TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the prevention of chemical or biological attacks on building air circulation systems. More specifically, the invention comprises a detection system which isolates contaminants to prevent their circulation within a building.

2. Description of the Related Art

It is well known that particulate contamination of a gas will cause the attenuation of a light beam traveling through the gas. As one example, U.S. Pat. No. 5,766,956 to Groger, et al. (1998) discloses the use of a diode laser emitter to detect the presence of chemical or biological agents. The attenuation resulting from the presence of a particular contaminant also varies with the wavelength of the light used. FIGS. 5 through 7 in the '956 disclosure illustrate this phenomenon. It is thus known that certain wavelengths of lights are particularly useful for detecting certain classes of substances.

Optical detection systems have become increasingly sophisticated, with an emphasis on eliminating false alarms caused by ambient lighting and contaminant accumulation on the optical surfaces of the device. One example of such a sophisticated detection system is found in U.S. Pat. No. 5,946,092 to DeFreez, et al. (1999). It is also known to combine different types of sensors to eliminate false alarms. This is particularly true in the field of fire detection. U.S. Pat. No. 5,945,924 to Marman, et al. (1999) teaches the combination of a particle sensor with a carbon dioxide sensor to eliminate false alarms.

Practically all optical sensors suffer degraded performance over time. This results from the fact that the optical surfaces become dusty with use. If a fixed level of attenuation is used to trigger the detector, this level may be reached by the accumulation of dust. Frequent cleaning is one remedy for this problem. However, techniques have evolved to permit the adjustment of the trigger threshold over time. One such approach is disclosed in U.S. Pat. No. 6,107,925 to Wong (2000). The Wong device adjusts its trigger threshold to account for dust contamination over time.

The events of 2001 have raised concerns regarding biological and chemical attacks on commercial buildings. Most such buildings have external intakes for their HVAC systems. Many of these intakes are in exposed positions—in parking garages or along the streets. If a chemical or biological agent is introduced into the HVAC system, the system will quickly circulate the contaminant throughout the building.

U.S. Pat. No. 6,217,441 to Pearman, et al. (2001) discloses a gas-activated seal which can restrict the flow of air through a duct. Many other prior-art devices are available to shut off flow through a duct. However, the prior art devices have not combined a contaminant sensor with a control to isolate the spread of the contaminant.

The known devices are therefore limited in that although they are capable of detecting contaminants, they do not contain and isolate the contaminant.

BRIEF SUMMARY OF THE INVENTION

The present invention comprises an apparatus for detecting and containing chemical or biological contaminants. The invention includes one or more optical contaminant detectors, capable of detecting chemical and biological agents. A containment assembly is installed in the duct work of a building, just downstream from the main intake. Air flows linearly through the containment assembly. The air first flows through a first damper, then through the contamination sensor or sensors, and then through a second damper.

If a sensor senses a contaminant, a controller shuts off the HVAC system, while simultaneously closing the first and second dampers. The containment assembly is thereby hermetically sealed—trapping any contaminants inside. The sensors and second damper are spaced sufficiently far apart so that no contaminant will flow through the second damper before its closure. The controller can also be configured to alert authorized personnel as to the potential contamination.

Accordingly, several objects and advantages of the present invention are:

1. To detect chemical or biological contaminants in an air duct;
2. To shut off the building HVAC system in response to an attack;
3. To alert the appropriate persons regarding the existence of an attack; and
4. To contain any contaminants already in the air duct in such a fashion that they cannot escape.

These objects and advantages will be fully explained in the details hereafter described, explained, and claimed, with reference being made to the accompanying drawings.

REFERENCE NUMERALS IN THE DRAWINGS

| 10 | containment assembly | 12 | intake duct |
| 14 | first damper | 16 | second damper |
| 18 | damper drive | 20 | controller |
| 22 | HVAC system | 24 | emitter |
| 26 | detector | 28 | near IR monitor |
| 30 | far IR monitor | 32 | primary mirror |
| 34 | secondary mirror | 36 | frame |
| 38 | beam | 40 | reflection point |
| 42 | louvers | | |

DETAILED DESCRIPTION OF THE INVENTION

Most commercial buildings are equipped with HVAC systems which pull in some ambient air from outside the building and circulate the air within the building—often after heating or cooling it to a desired temperature. The intakes for these systems may be located at street level or within a parking garage and inside the buildings where the air is recirculated. Such intakes are accessible to persons walking up to the building. The present design of such HVAC systems therefore render the buildings vulnerable to chemical or biological attack, in that a terrorist could introduce a chemical or biological agent to the intake. The HVAC system would then circulate the agent throughout the building, potentially exposing thousands of people. The present invention seeks to eliminate this concern.

Figure 1:
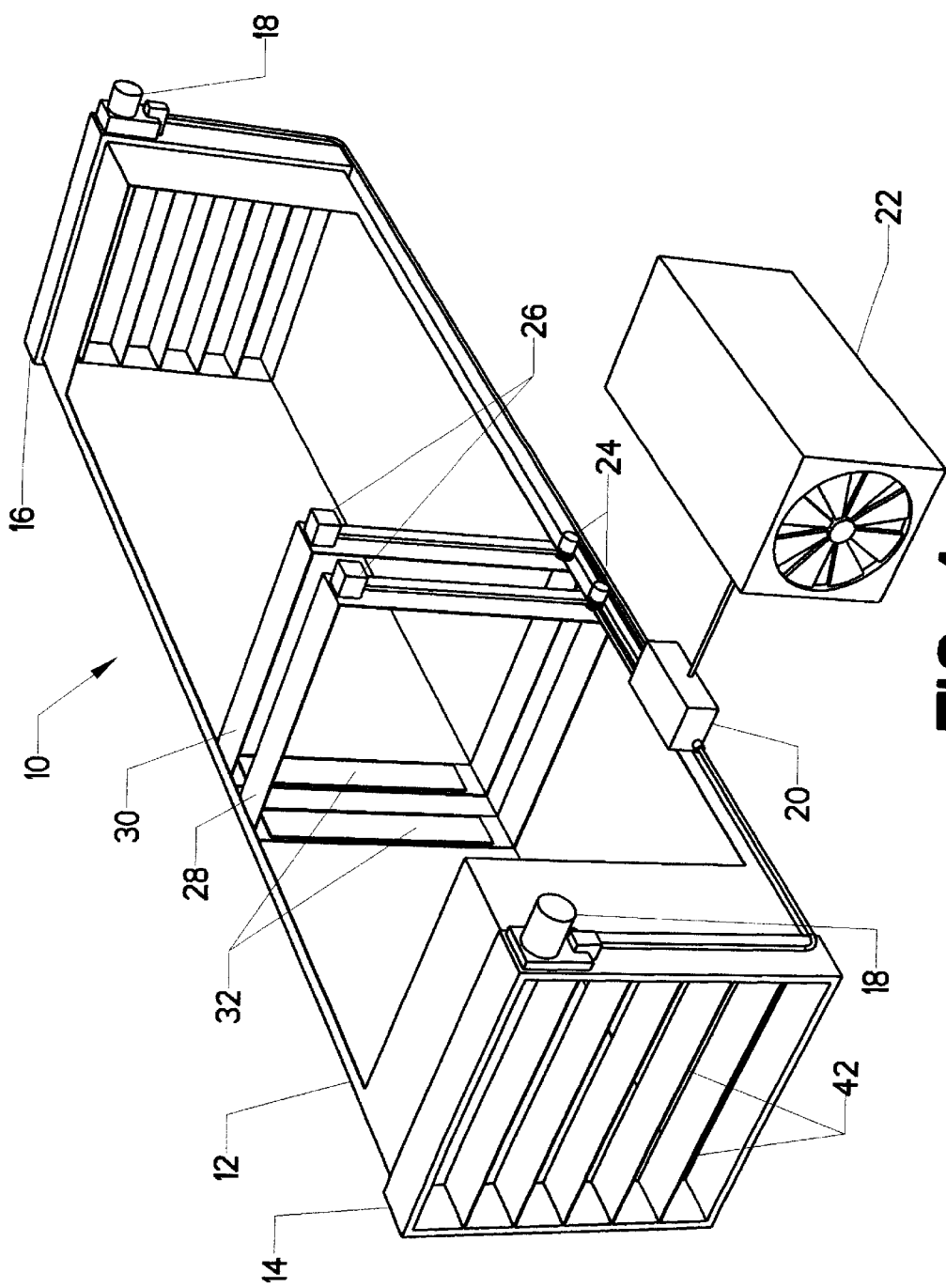
FIG. 1 is an isometric view, showing the proposed invention.

Referring now to FIG. 1, containment system 10 must be installed in close proximity to the building intake. The view incorporates a cutaway to show internal features. The primary structural element is intake duct 12. Intake duct 12 has a first open end, which is closest to the viewer in FIG. 1. First damper 14 is attached to this first open end. First damper 14 is equipped with a set of louvers 42. In the position shown, louvers 42 allow the free passage of air into intake duct 12. However, damper drive 18 can reorient louvers 42 so as to hermetically seal the first end of intake duct 12.

Second damper 16 is attached to the second end of intake duct 12. It is identical to first damper 14 —including the ability to hermetically seal the second end of intake duct 12. In the position shown, air flows freely through second damper 16, and from then on into the building HVAC system. However, if second damper 16 is closed, then containment assembly 10 is shut off from the building HVAC system.

Although intake duct 12 has numerous openings to admit control wires and the like, all these openings are hermetically sealed. Thus, the only way for air to enter or leave intake duct 12 is through first damper 14 or second damper 16. When the two dampers are closed, intake duct 12 becomes a sealed vessel.

In FIG. 1, the air will flow through the device from left to right. Thus, near IR monitor 28 is downstream of first damper 14. Likewise, far IR monitor 30 is downstream from near IR monitor 28. Near IR monitor 28 and far IR monitor 30 are configured to detect chemical or biological agents in the airstream. If either monitor detects such an agent, it sends a message to controller 20. Controller 20 then activates the two damper drives 18 to shut off first damper 14 and second damper 16. Controller 20 may also be used to shut down the building HVAC 22. It can also be configured to send an alert signal to authorized persons within the building.

When the dampers have been closed, the chemical or biological agents should be sealed within containment system 10. The reaction time of the components is therefore an important consideration. There must be enough distance between the monitors and second damper 16 to allow second damper 16 to completely close before the agent passes through second damper 16. This distance will be determined by the speed of the airflow, the speed of the monitors, the speed of controller 20, and the speed of the dampers in completely shutting off the flow. As a practical matter, containment assembly 10 will typically need to be longer than the version shown in FIG. 1.

The nature of the monitors will now be described in detail. It is well known that electromagnetic energy—particularly visible light and the infrared portion of the spectrum—are attenuated by the presence of solid aerosols, liquid aerosols, or gases. A given aerosol or gas will attenuate different wavelengths of light to different degrees. See for example FIGS. 5 through 7 of U.S. Pat. No. 5,766,956. Thus, it is well known that selected bands of the electromagnetic spectrum are better for detecting certain types of aerosols or gases than others. This fact means that a particular aerosol or gas will have an absorption "signature" which will allow its identification via the technique of shining a beam of light through the air containing the aerosol or gas and measuring the attenuation.

Figure 2:
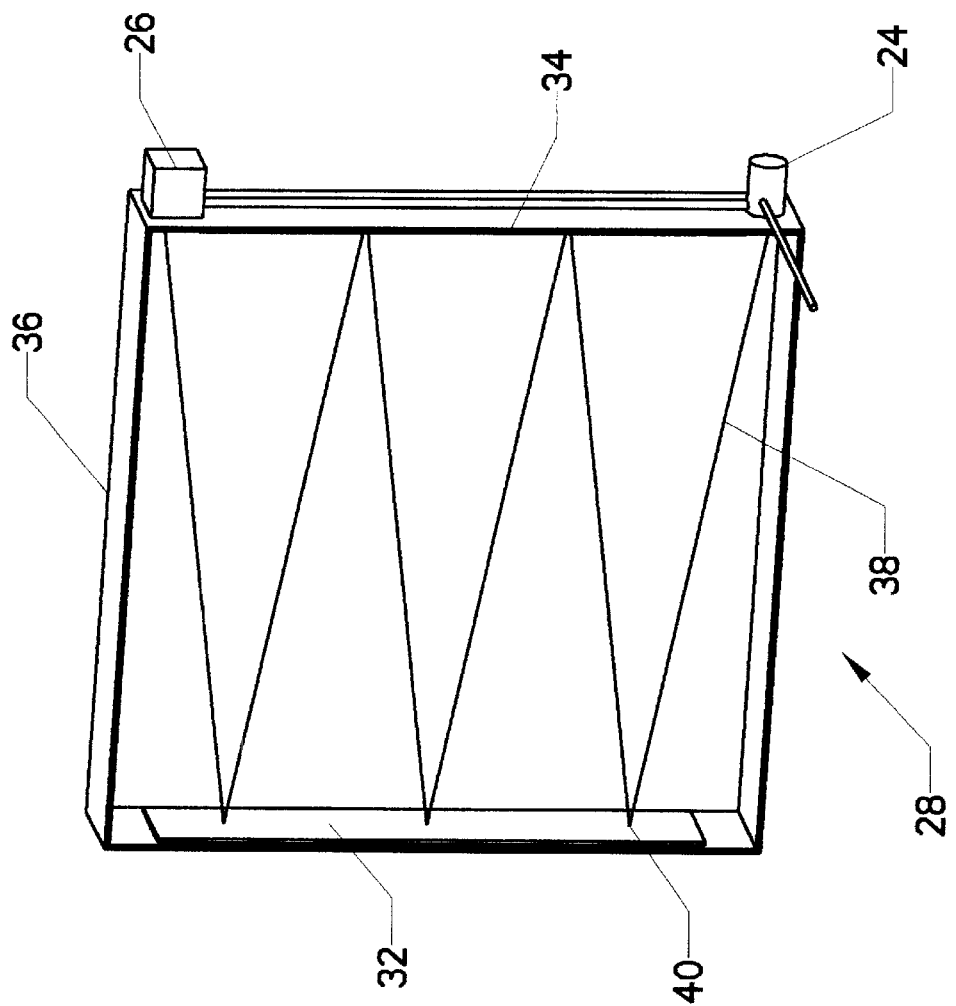
FIG. 2 is an elevation view, showing the operation of one optical sensor.

Turning now to FIG. 2 of the present invention, the reader will observe that near IR sensor 28 has a square frame 36, which fits within intake duct 12. Emitter 24 shines beam 38 across the moving air stream. Beer's Law describes how a beam of electromagnetic energy is attenuated as it passes through a medium (gas, liquid, or solid). It states that the beam's energy is exponentially reduced by the concentration of particles in the medium, by the length of travel through the medium, and by the attenuation coefficient of the medium. Attenuation effects are best measured using a substantial length of travel for beam 38. In order to avoid an unduly large device, it is therefore advantageous to reflect beam 38 back and forth using mirrors. Beam 38 first encounters primary mirror 32, where it is reflected back toward secondary mirror 34 (directly across from primary mirror 32). As shown in the view, beam 34 is reflected back and forth several more times before ultimately falling on detector 26.

Electronic analysis means (typically incorporated in controller 20) are employed to compare the electromagnetic energy leaving emitter 24 to the energy received at detector 26. A set trigger level is established so that if the ratio of these energies falls below the trigger level, a signal will be sent indicating the presence of a chemical or biological agent.

Those skilled in the art will know that the mirror employed in the system must have a high reflectivity for the wavelengths of light being emitted by emitter 24. The embodiment shown in FIG. 2 is a simplified version with relatively few reflections. In practice, it is advantageous to use 20 reflections or more. Every time beam 38 strikes a mirror, it creates a reflection point 40. The energy of the beam will be attenuated at each reflection point 40 —even in the absence of chemical or biological agents. This inherent attenuation must be accounted for. If, as an example, the beam is reflected twenty times off a mirror having a reflectivity of 95 percent, then approximately 36 percent of the original beam energy would reach detector 26. At a reflectivity of 85 percent, only 4 percent of the original beam energy would reach detector 26. It is therefore advantageous to use highly reflective mirrors. Gold-plated mirrors are particularly effective, having a reflectivity of approximately 98 percent.

The monitors employed in the device should be tuned to be most effective on likely biological or chemical agents. Solid particles or liquid droplets that can be effectively inhaled and retained through normal human breathing lie within the range of 1 micron to 5 microns in diameter. Electromagnetic energy having a wavelength between 0.8 microns and 1.2 microns is substantially attenuated by particles in this size range. This wavelength range is often referred to as the "near infrared." Thus, referring to FIG. 1, near IR monitor 28 should ideally be tuned to this near infrared band. It will therefore be primarily responsible for detecting solid particles or liquid droplets in the range of 1 to 5 microns.

Far IR monitor 30, which has the same physical structure as near IR monitor 28, is tuned to two or more other specific bands. The first of these is in the range of 2.7 microns to 3.7 microns. The second is in the range of 5.4 microns to 10 microns. Virtually all airborne materials, with alkali halides being an exception, will attenuate electromagnetic energy in these bands. The selection of the bands can be accomplished using numerous prior art methods—including tuning the emitters to produce only these bands, or using a broad-spectrum emitter in conjunction with band pass filters on the detectors.

Either or both of near IR monitor 28 or far IR monitor 30 could be triggered by the presence of foreign materials within intake duct 12. As an example—biological agents are often produced in the form of small particles. These particles are difficult to transport through the air. Thus, a terrorist who wanted to spread the particles might use a volatile liquid carrier. The particles and the liquid carrier would be placed in a pressurized container, then vented into a building's air intake. The solid particles and the liquid carrier droplets would be detected by near IR monitor 28. If the droplets evaporated, they would be detected by far IR monitor 30. Likewise, if a finely ground solid is introduced using a pressurized air blast, it would be detected by near IR monitor 28.

Those skilled in the art will know that particle accumulation on the emitters, mirrors, and detectors will over time degrade the performance of the system. If the monitors are not cleaned, then the gradual accumulation of this dust will eventually produce a false alarm. This problem can obviously be cured by routinely cleaning the monitors. However, in order to extend the time between such routing cleanings, another technique is employed: Those skilled in the art will know that energy attenuation resulting from dust buildup will occur gradually. In contrast, energy attenuation resulting from the introduction of foreign chemical or biological agents will be quite sudden. Thus, controller 20 will ideally include logic circuitry—possibly including the use of computer software—which will adjust the triggering ratio for each pair of emitters and detectors over time. The triggering ratio will be adjusted downward to reflect the gradual reduction caused by dust accumulation. A signal will then only be sent if a monitor detects a rapid reduction in the ratio of the detector to the emitter. In this way, false alarms can be greatly reduced.

As mentioned previously, the detection of a chemical or biological agent will cause controller 20 to seal containment system 10. Controller 20 can also send a signal to shut down the building's HVAC 22. A specific alarm signal can be sent to authorized personnel within the building, informing them of which monitor was triggered (thereby suggesting what type of agent is present).

Accordingly, the reader will appreciate that the proposed invention can detect the presence of chemical or biological agents in the intake of a building HVAC system. The invention has further advantages in that it:

1. Prevents the chemical or biological agents from entering the HVAC system and thereby circulating throughout the building;
2. Shuts off the circulation of the HVAC system;
3. Prevents the agents within the invention from escaping back into the air around the building; and
4. Provides an alarm to the appropriate persons.

Although the preceding description contains significant detail, it should not be construed as limiting the scope of the invention but rather as providing illustrations of the preferred embodiment of the invention. As an example, a single emitter could be used to emit the necessary bandwidths of light, rather than a group of two or three separate emitters. Likewise, a single detector with the appropriate bandpass filters could be used to detect three separate wavelengths of light, rather than using three separate detectors. Thus, the scope of the invention should be fixed by the following claims, rather than by the examples given, with the understanding that a single device could incorporate several emitters or detectors.

We claim:

1. A device for detecting and preventing chemical or biological agents from contaminating a building air circulation system, comprising:

a. an intake duct, having a first end which takes in ambient air, and a second end which discharges said air into said air circulation system;

b. a first damper, attached to said first end of said intake duct, and movable between an open position wherein said air flows freely through said first damper, and a closed position wherein said first end of said intake duct is hermetically sealed;

c. a second damper, attached to said second end of said intake duct, and movable between an open position wherein said air flows freely through said second damper, and a closed position wherein said second end of said intake duct is hermetically sealed;

d. sensing means, capable of sensing the presence of said chemical or biological agents within said intake ducts; and e. control means, for closing said first and second dampers when said sensing means detects the presence of said chemical or biological agents, so as to hermetically seal said intake duct.

2. The device as recited in claim 1, wherein said control means is also capable of stopping the circulation of said building air circulation system.

3. The device as recited in claim 1, wherein said control means is also capable of alerting authorized personnel within said building.

4. A device as recited in claim 1, wherein said sensing means comprises:

a. an emitter, capable of transmitting a beam of light through said air within said intake duct;

b. a detector, positioned to receive said beam of light after it has traveled through said air;

c. computing means capable of determining the attenuation of said beam of light resulting from its travel through said air; and d. trigger means for sending a signal to said control means when said attenuation of said light beam exceeds a fixed threshold.

5. A device as recited in claim 4, further comprising a primary mirror, capable of reflecting said beam of light as it travels through said air within said duct, so as to lengthen the length of travel between said emitter and said detector.

6. A device as recited in claim 5, further comprising a secondary mirror, capable of reflecting said beam of light as it travels through said air within said duct, so as to lengthen the length of travel between said emitter and said detector.

7. A device as recited in claim 4, wherein said emitter transmits light having a wavelength in the range from 0.8 microns to 1.2 microns.

8. A device as recited in claim 4, wherein said emitter transmits light having a wavelength in the range of 2.7 microns to 3.7 microns.

9. A device as recited in claim 4, wherein said emitter transmits light having a wavelength in the range of 5.4 microns to 10.0 microns.

10. A device as recited in claim 7, further comprising:
   a. a second emitter, capable of transmitting a beam of light through said air within said intake duct, wherein said beam of light has a wavelength in the range of 2.7 microns to 3.7 microns;
   b. a second detector, positioned to receive said beam of light from said second emitter after it has traveled through said air;
   c. computing means capable of determining the attenuation of said beam of light from said second emitter resulting from its travel through said air; and
   d. trigger means for sending a signal to said control means when said attenuation of said light beam from either said first emitter or said second emitter exceeds a fixed threshold.

11. A device as recited in claim 10, further comprising:
   a. a third emitter, capable of transmitting a beam of light through said air within said intake duct, wherein said beam of light has a wavelength in the range of 5.4 microns to 10.0 microns;
   b. a third detector, positioned to receive said beam of light from said third emitter after it has traveled through said air;
   c. computing means capable of determining the attenuation of said beam of light from said third emitter resulting from its travel through said air; and
   d. trigger means for sending a signal to said control means when said attenuation of said light beam from either said first emitter, said second emitter, or said third emitter exceeds a fixed threshold.

12. A device as recited in claim 1, wherein said control means comprises a computer.

* * * * *